United States Patent
Rhodes et al.

(10) Patent No.: US 11,676,278 B2
(45) Date of Patent: Jun. 13, 2023

(54) DEEP LEARNING FOR DENSE SEMANTIC SEGMENTATION IN VIDEO WITH AUTOMATED INTERACTIVITY AND IMPROVED TEMPORAL COHERENCE

(71) Applicant: Intel Corporation, Santa Clara, CA (US)

(72) Inventors: Anthony Rhodes, Santa Clara, CA (US); Manan Goel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 16/584,709

(22) Filed: Sep. 26, 2019

(65) Prior Publication Data

US 2020/0026928 A1    Jan. 23, 2020

(51) Int. Cl.
*G06K 9/00* (2022.01)
*G06T 7/11* (2017.01)
(Continued)

(52) U.S. Cl.
CPC .............. *G06T 7/11* (2017.01); *G06F 18/217* (2023.01); *G06F 18/24* (2023.01); *G06T 7/174* (2017.01); *G06T 7/20* (2013.01); *G06T 7/70* (2017.01); *G06T 7/97* (2017.01); *G06V 10/454* (2022.01); *G06V 10/764* (2022.01); *G06V 10/82* (2022.01); *G06V 20/41* (2022.01); *G06V 20/49* (2022.01);
(Continued)

(58) Field of Classification Search
CPC .... G06V 20/49; G06V 10/454; G06V 10/764; G06V 10/82; G06V 20/41; G06V 10/25; G06V 20/42; G06V 20/46; G06K 9/6262; G06K 9/6267; G06T 7/174; G06T 7/20; G06T 7/70; G06T 7/97; G06T 2200/24; G06T 2207/10016; G06T 2207/20081; G06T 2207/20084; G06T 7/11; G06T 7/194; G06T 7/12; G06T 7/136; G06T 7/215; G06N 3/0454; G06N 3/08
See application file for complete search history.

(56) References Cited

U.S. PATENT DOCUMENTS

2020/0143171 A1*  5/2020  Lee ..................... G06V 10/764

OTHER PUBLICATIONS

Rhodes, Anthony D., and Manan Goel. "High Fidelity Interactive Video Segmentation Using Tensor Decomposition, Boundary Loss, Convolutional Tessellations, and Context-Aware Skip Connections." European Conference on Visual Media Production. 2020. (Year : 2020).*

(Continued)

*Primary Examiner* — Andrew M Moyer
(74) *Attorney, Agent, or Firm* — Essential Patents Group, LLP

(57) ABSTRACT

Techniques related to automatically segmenting video frames into per pixel dense object of interest and background regions are discussed. Such techniques include applying a segmentation convolutional neural network (CNN) to a CNN input including a current video frame, a previous video frame, an object of interest indicator frame, a motion frame, and multiple feature frames each including features compressed from feature layers of an object classification convolutional neural network as applied to the current video frame to generate candidate segmentations and selecting one of the candidate segmentations as a final segmentation of the current video frame.

22 Claims, 9 Drawing Sheets

(51) Int. Cl.
- *G06T 7/20* (2017.01)
- *G06T 7/174* (2017.01)
- *G06T 7/00* (2017.01)
- *G06T 7/70* (2017.01)
- *G06V 20/40* (2022.01)
- *G06F 18/24* (2023.01)
- *G06F 18/21* (2023.01)
- *G06V 10/764* (2022.01)
- *G06V 10/82* (2022.01)
- *G06V 10/44* (2022.01)

(52) U.S. Cl.
CPC ............ *G06T 2200/24* (2013.01); *G06T 2207/10016* (2013.01); *G06T 2207/20081* (2013.01); *G06T 2207/20084* (2013.01)

(56) References Cited

OTHER PUBLICATIONS

Jain, Suyog Dutt, Bo Xiong, and Kristen Grauman. "FusionSeg: Learning to Combine Motion and Appearance for Fully Automatic Segmentation of Generic Objects in Videos." 2017 IEEE Conference on Computer Vision and Pattern Recognition (CVPR). IEEE, 2017. (Year: 2017).*

He, K. et al., "Deep Residual Learning for Image Recognition", IEEE Conference on Computer Vision and Pattern Recognition, 2016, 9 pages.

Huang, et al., "Densely Connected Convolutional Networks", IEEE Conference on Computer Vision and Pattern Recognition (CVPR); 2017, 9 pages.

Li, et al., "Interactive Image Segmentation with Latent Diversity", Intel Labs; CVPR 2018.

* cited by examiner

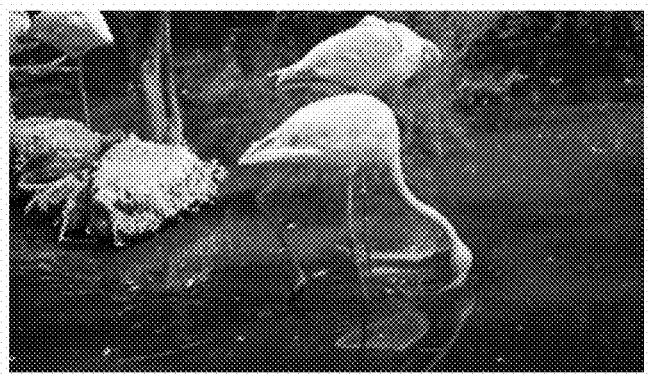
701
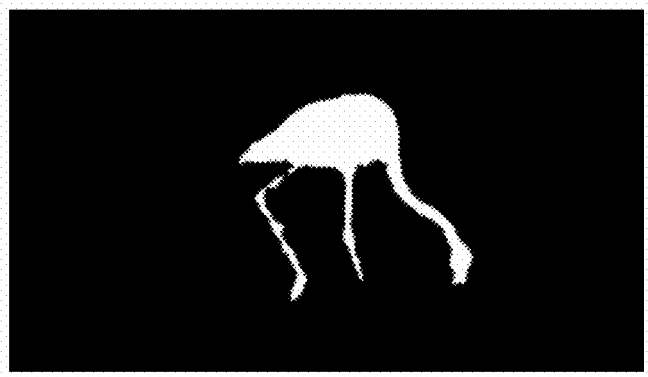
702
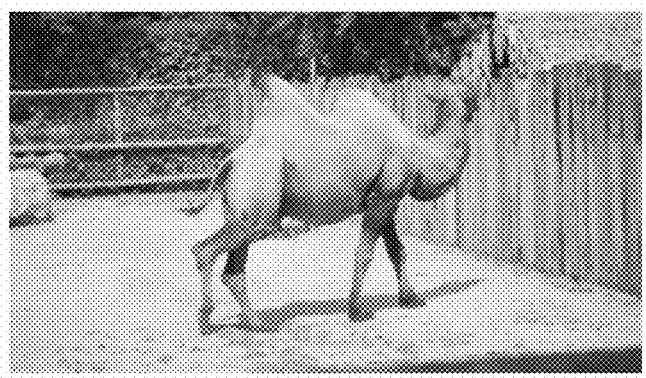
711
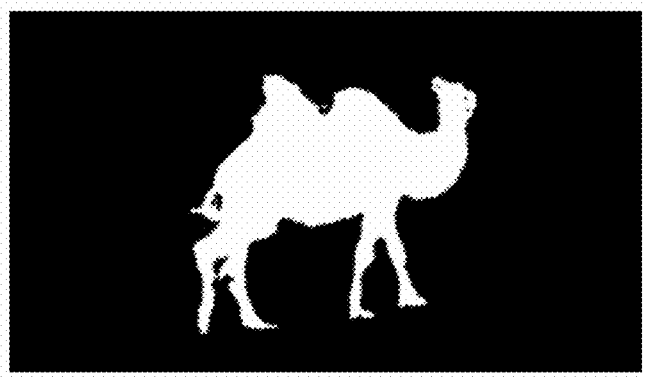
712
FIG. 7

DEEP LEARNING FOR DENSE SEMANTIC SEGMENTATION IN VIDEO WITH AUTOMATED INTERACTIVITY AND IMPROVED TEMPORAL COHERENCE

BACKGROUND

In interactive video segmentation, user input is received that indicates, via user clicks on an image, a foreground object or object of interest (e.g., positive clicks) and a background (e.g., negative clicks). The user input is then utilized to automatically render pixel-level segmentation of the object of interest throughout the video clip. Such interactive video segmentation may be used in rotoscoping (e.g., the process of transferring an image into another video sequence) or other applications. Notably, the resultant semantic segmentation data is useful in a variety of contexts such as visual effects. For example, automatic video segmentation may advantageously replace labor intensive and costly rotoscoping techniques that are used in media, film, and related industries.

Current semantic techniques include the use of handcrafted features and distance metrics as well as the use of convolutional neural networks to segment a still image into, for example, foreground and background regions. However, there is an ongoing interest in improved dense semantic segmentation. It is with respect to these and other considerations that the present improvements have been needed. Such improvements may become critical as the desire to apply dense semantic segmentation in video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 illustrates example input video frames for segmentation and corresponding final segmentations;

DETAILED DESCRIPTION

Figure 1:
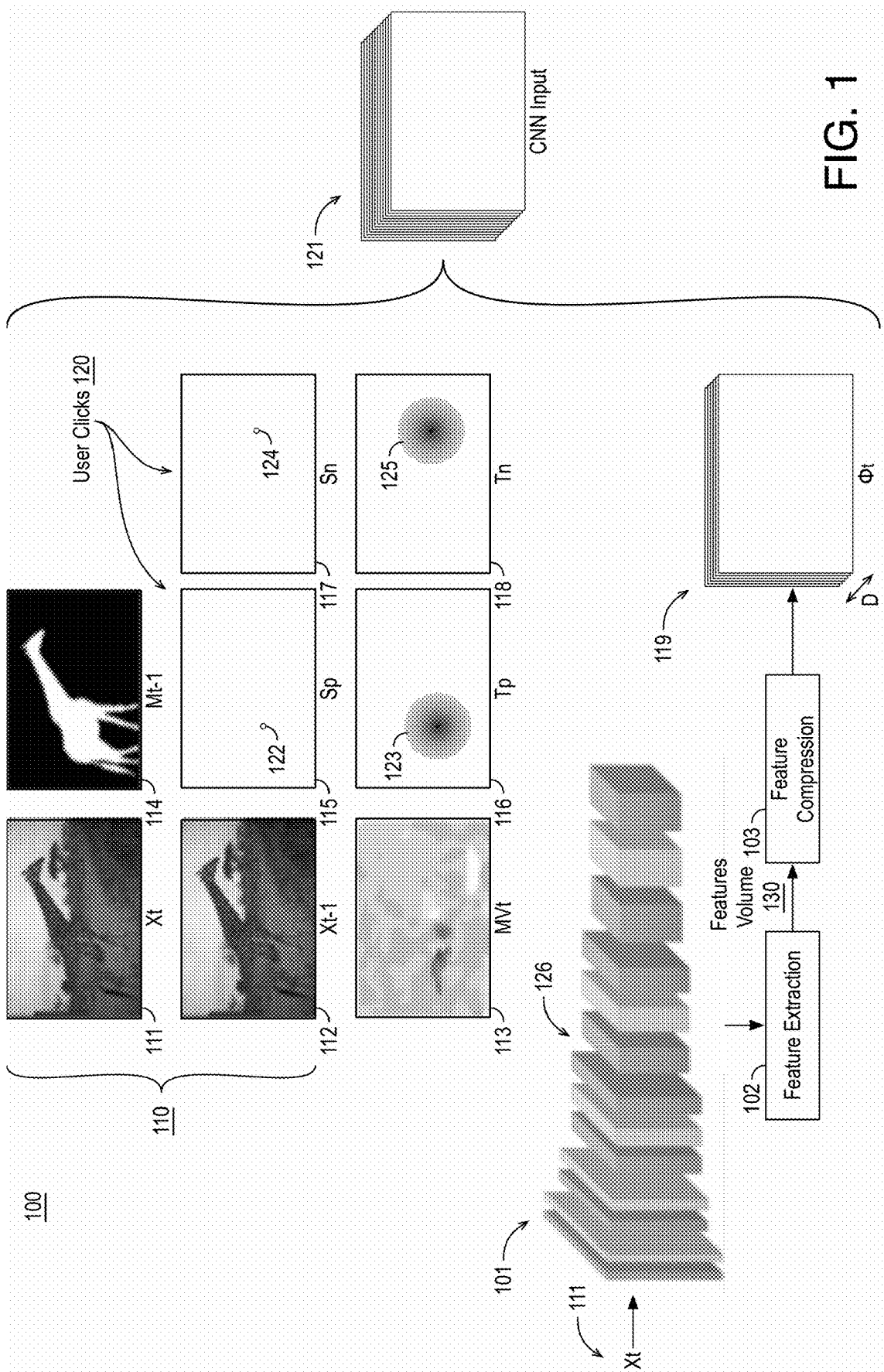
FIG. 1 illustrates generation of an example convolutional neural network input by an example system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to dense semantic segmentation in video using deep learning.

As described above, it may be advantageous to semantically segment each video frame of a video sequence into, for example, foreground and background regions. For example, a user may click on a first video frame of a sequence of video frames to indicate locations in the frame that include an object of interest (e.g., positive clicks) and locations that do not include the object of interest, which may be characterized as background regions (e.g., negative clicks). Using such user provided information, it is desirable to densely segment each video frame into a region having the object of interest (or multiple objects of interest) and another region having the background. Accurate dense segmentation data is desirable in a variety of visual effects contexts. Such dense segmentation data may include any pixel wise information (or dense region information such as 2×2 pixel regions) that indicates whether the pixel is in the object of interest or not. Such data may be binary or may indicate a likelihood or probability (e.g., from 0 to 1, inclusive) that the pixel is in the object of interest. Such probability data may be used to generate a binary mask using a threshold of 0.5, for example.

As discussed herein, a pretrained segmentation convolutional neural network (CNN) is used to generate multiple candidate segmentations for a current video frame based on a convolutional neural network input that includes a number of frames. As used herein, the term frame in the context of a CNN input indicates a 2D data structure having a feature value for each pixel of the frame. Such feature values include, for a video frame for example, red values, green values, and blue values (e.g., an input frame for each of the RGB color values), an indicator of a positive user click or projected positive user click (e.g., a value of 1 at locations of a positive user click and values of 0 elsewhere), values indicative of a distance from the pixel to a positive or negative user click, values indicative of motion (e.g., per pixel velocity motion vectors), feature values compressed from layers of an object classification CNN, and so on. Such data structures are discussed further herein.

In some embodiments, the CNN input include at least a current video frame, a temporally previous video frame, a user input frame including one or more indicators of an object of interest in the current video frame, a motion frame including motion indicators indicative of motion from the previous video frame to the current video frame, and multiple feature frames each including features compressed from layers of an object classification CNN as applied to the current video frame. Such a CNN input may be characterized as a CNN input volume, CNN input frames, CNN input feature maps, or the like. The segmentation CNN may include any number of CNN layers to generate multiple candidate segmentations of the current video frame. For example, each candidate segmentation may include a pixel wise value indicating a probability the pixel is part of the object of interest. Using the candidate segmentations, a final segmentation may then be selected using any suitable technique or techniques. In an embodiment, a selection CNN, pretrained to select a final segmentation, is applied to a CNN input including the candidate segmentations, the current video frame, and the user input frame. As used herein, the term CNN indicates a network that includes at least one convolutional layer, which convolves one or more filters with input volume feature maps to generate output feature maps.

The techniques discussed herein provide dense segmentation in video with improved temporal coherence. Furthermore, the discussed techniques provide for fully automated segmentation of the video after user input is provided for a first frame in a sequence by simulating subsequent user input using optical flow techniques (e.g., using optical flow enabled click tracking). Thereby, practical, class-agnostic, interactive deep learning-based techniques for object segmentation in video data with minimal user intervention are provided. Notably, the discussed techniques improve temporal coherence of segmentation between video frames based at least on application of the segmentation CNN to a previous video frame and a motion frame, provide an application-driven tensor decomposition compression to a features from a deep CNN object classification network, and provide training of the segmentation CNN with a boundary loss function to enforce smooth, quality segmentation contours. In some embodiments, the discussed techniques may be applied to provide an end-to-end, artificial intelligence based rotoscoping technique applicable in fixed source camera applications that requires minimal user inputs to render accurately segmented video of foreground subjects.

FIG. 1 illustrates generation of an example convolutional neural network input 121 by an example system 100, arranged in accordance with at least some implementations of the present disclosure. Notably, convolutional neural network (CNN) input 121 may be input to a segmentation CNN as is discussed further herein to attain multiple candidate segmentations of a current video frame 111. As used herein, the term segmentation CNN indicates a CNN that generates multiple candidate segmentations based on a CNN input such that each of the multiple candidate segmentations indicates a probability that each pixel thereof is in an object of interest. The probability may be binary (e.g., 1 for in the object of interest or 0 for outside the object of interest) or scaled to a particular range (e.g., from 0 to 1 inclusive).

As shown in FIG. 1, system 100 includes a feature extraction module 102 and a feature compression module 103. System 100 may include a processor, memory, etc. implemented via any suitable form factor device as discussed herein to generate CNN input 121. For example, system 100 may be implemented as a personal computer, a laptop computer, a tablet, a phablet, a smart phone, a digital camera, a gaming console, a wearable device, a display device, an all-in-one device, a two-in-one device, or the like. For example, system 100 may perform CNN input generation, candidate segmentation generation, and final segmentation selection as discussed herein. In some embodiments, system 100 further includes one or more image capture devices to capture input video 110 although such input video may be received from another device.

As discussed below with respect to FIG. 4, a segmentation CNN 401 ($f$) (e.g., a segmentation network) is applied to CNN input 121. As shown with respect to FIG. 1, CNN input 121 includes a current video frame 111 (Xt) of input video 110, a previous video frame 112 (Xt−1) of input video 110, a motion frame 113 (MVt), a previous segmentation frame 114 (Mt−1), an object of interest indicator frame 115 (or positive indicator frame) (Sp), a background indicator frame 117 (or negative indicator frame) (Sn), a positive distance transform frame 116 (or distance to object of interest indicator frame) (Tp), a negative distance transform frame 118 (or distance to background indicator frame) (Tn), and multiple feature frames 119 (Φt) that include features compressed from layers of an object classification convolutional neural network as applied to the current video frame. Each of such frames of CNN input 121 are discussed herein below.

System 100 receives input video 110 and user click indicators 120. Input video 110 may include any suitable video frames, video pictures, sequence of video frames, group of pictures, groups of pictures, video data, or the like in any suitable resolution. For example, the video may be in video graphics array (VGA), high definition (HD), Full-HD (e.g., 1080p), 2K resolution video, 4K resolution video, 8K resolution video, or the like, and the video may include any number of video frames, sequences of video frames, pictures, groups of pictures, or the like. In some embodiments, input video 110 is downsampled prior to CNN processing. Techniques discussed herein are discussed with respect to video frames for the sake of clarity of presentation. However, such frames may be characterized as pictures, video pictures, sequences of pictures, video sequences, etc. In some embodiments, input video has three channels such as RGB channels, although other formats such as YUV, YCbCR, etc. may be used. Notably, as used herein, when part of CNN input 121, a video frame (current or previous) may include a single frame of CNN input 121 (e.g., a luma frame) or multiple frames of CNN input 121 (e.g., one frame for the R channel, one frame for the G channel, and one frame for the B channel). Previous video frame 112 may be any temporally prior or previous (in capture and display order) with respect to current video frame 111 such as an immediately temporally prior frame such that there are no intervening frames between previous video frame 112 and current video frame 111.

As discussed, system 100 also receives user click indicators 120, which are indicative of locations within or inclusive of an object of interest (e.g., within the giraffe), which are characterized as positive clicks, and locations outside of or exclusive of the object of interest (e.g., outside the giraffe). As used herein the term object of interest indicates any object within an image that a user desires to segment from the remainder (e.g., background) of the image. Often, an object of interest is continuous in that it has a single border and forms an unbroken whole within the border. The object of interest may be any object, person, animal, etc. The user input may be received using any suitable technique or techniques. In some embodiments, in place of such user click indicators 120, locations in and out of the object of interest may be attained using an object recognition CNN or other machine learning techniques. Furthermore, as discussed, user click indicators 120 may be received only for a first video frame of input video 110. For subsequent frames of input video 110 positive locations such as positive location 122 (e.g., a location of a positive indicator indicative of a location within the object of interest) within an object of interest indicator frame 115 may be projected from the initial user click locations. For example, for object of interest indicator frame 115, positive location 122 may be projected from a seed positive location in an initial object of interest frame such that the seed positive location was user provided. In an embodiment, projecting a positive (or negative) location includes translating the location according to a motion vector (indicating per pixel velocity) of motion frame 113 that corresponds to the location (e.g., a collocated motion vector, an average of motion vectors in a vicinity around the location, etc.).

Similarly, negative location 124 (e.g., a location of a negative indicator indicative of a location exclusive of the object of interest) within a background indicator frame 117 may be projected from the initial user click locations. For example, for background indicator frame 117, negative location 124 may be projected from a seed negative location in an initial background frame such that the seed negative location was user provided. Although illustrated with respect to a single positive location 122 and a single negative location 124, any number of positive and negative locations may be used.

Object of interest indicator frame 115 may include any suitable data structure including indicators indicative of locations (e.g., one or more indicators corresponding to one or more locations) within an object of interest such as a first value (e.g., 1) for pixel locations identified as an object of interest location and a second value (e.g., 0) for all other pixel locations. Similarly, background indicator frame 117 may include any suitable data structure including indicators indicative of locations within the background and exclusive of the object of interest such as a first value (e.g., 1) for pixel locations identified as in the background and a second value (e.g., 0) for all other pixel locations. For example, object of interest indicator frame 115 and background indicator frame 117 include indicators of an object of interest and a background such that the indicators indicate (e.g., using a first value) pixels that are inclusive of the object of interest and background, respectively.

Motion frame 113 may include any data structure indicative of motion from previous video frame 112 to current video frame 111. For example, motion frame 113 includes indicators indicative of motion from previous video frame 112 to current video frame such as per pixel velocity motion vectors (e.g., a motion vector for each pixel thereof) or other indictors of motion. Furthermore, motion frame 113 may be generated using any suitable technique or techniques such as dense optical flow techniques. In an embodiment, CNN input 121 includes motion frame 113 such that segmentation CNN 401 receives dense optical flow features determined between previous video frame 112 and the current video frame 111 applied over the image space. Such optical flow features advantageously provide improved temporal coherence in output candidate segmentations 403 generated by segmentation CNN 401.

Positive distance transform frame 116 and negative distance transform frame 118 may be generated from object of interest indicator frame 115 and background indicator frame 117, respectively. Positive distance transform frame 116 and negative distance transform frame 118 may include any suitable data structures indicative of proximity to locations of positive and negative indicators within object of interest indicator frame 115 and background indicator frame 117. In an embodiment, positive distance transform frame 116 includes, for each pixel thereof, a value indicative of a minimum distance to any of the location(s) of positive indicators in object of interest indicator frame 115. Similarly, in an embodiment, negative distance transform frame 118 includes, for each pixel thereof, a value indicative of a minimum distance to any of the location(s) of negative indicators in background indicator frame 117. In an embodiment, each value of positive distance transform frame 116 and negative distance transform frame 118 are determined as shown with respect to Equations (1):

$$T_p(p) = \min_{q \in S_p} \|p - q\|_2 \quad (1)$$

$$T_n(p) = \min_{q \in S_n} \|p - q\|_2$$

where Tp is positive distance transform frame 116, Tn is negative distance transform frame 118, p is any pixel location within positive distance transform frame 116 or negative distance transform frame, q is a closest positive indicator location (e.g., positive location 122 in object of interest indicator frame 115) or negative indicator location (e.g., negative location 124 in object of interest indicator frame 115). In the example of Equations (1), the per pixel minimum distances are determined as Euclidean distances, however any suitable distance measure may be used.

As shown with respect to positive distance transform frame 116, application of Equations (1) generates a region 123 around the collocated position with respect to positive location 122 such that region 123 has larger values moving concentrically away from the collocated position with respect to positive location 122. Although discussed with respect to small values at the collocated position with respect to positive location 122 and larger values moving away therefrom, alternatively larger values may be used at the collocated position with respect to positive location 122 with values becoming smaller moving away therefrom. For example, the inverse of Equations (1) may be used, etc. Similarly, application of Equations (1) generates a region 125 around the collocated position with respect to negative location 124 such that region 125 again has larger values moving concentrically away therefrom although the inverse may also be used. As will be appreciated, application of multiple positive locations 122 (or negative locations 124) provides for additional regions 123 (or regions 125) that may be overlapping. For example, positive distance transform frame 116 and negative distance transform frame 118 provide heat maps or contours regarding distance to a closest positive or negative location to guide a CNN in areas likely to be an object of interest or a background region.

Furthermore, CNN input 121 includes previous segmentation frame 114, which is a selected segmentation corresponding to previous video frame 112. Notably, for a first frame of input video 110, a still image segmentation CNN and a still image selection CNN or an object recognition CNN may be used to generate an initial segmentation frame. Subsequent segmentation frames are generated by segmentation CNN 401 and a selection of one of multiple candidate segmentations 403 (such as a selection CNN 402) as discussed further herein. Previous segmentation frame 114 may include any suitable data structuring indicating segmentation such as per pixel values indicating, for each pixel, the likelihood that the pixel is in an object of interest such as a value ranging from 0 to 1, inclusive.

As shown, feature frames 119 are generated for inclusion in CNN input 121 such that feature frames 119 each include features compressed from layers of an object classification convolutional neural network as applied to the current video frame. As used herein, the term feature or feature value indicates a value that is part of a feature map or feature frame such that all features in a feature map or frame correspond in that they are attained via the same processing such as application of a CNN, compression, etc. Notably, feature frames 119 may include many (e.g., about 700) feature frames with each frame including per pixel features at the resolution of current video frame 111 such that feature frames 119 are compressed from feature frames (e.g., about 1400) at a compression rate such as 50%. Although discussed with respect to a 50% compression rate, any rate may be used such as reduction of feature frames by 30% to 40%, reduction of feature frames by 40% to 60%, or the like. As discussed below, feature frames 119 are generated by applying an object detection CNN 101 to current video frame 111, retrieving, for each pixel of current video frame 111, multiple values each from one of the layers of the classification convolutional neural network to generate a hypercolumn of feature values for each pixel, and compressing the hypercolumns to feature frames 119. Taken together, the hypercolumn of feature values from object detection CNN 101 define multiple feature maps that are subsequently compressed to fewer feature maps. Looking at the application of object detection CNN 101 in another way, after application, multiple feature maps may be retrieved from the object detection CNN 101 such that each feature map corresponds to a layer of the object detection CNN 101 with each feature map having a feature value corresponding to a pixel of current video frame 111.

As discussed, object detection CNN 101 is applied to current video frame 111 and feature extraction module 102 extracts features volume 130 from layers of object detection CNN 101. As used herein, the term object detection CNN indicates any CNN used to perform object detection on an input image. Although discussed with respect to object detection CNN 101, any pretrained CNN may be used. In an embodiment, object detection CNN 101 is a pretrained CNN such as the VGG-19 CNN. In an embodiment, features volume 130 are feature maps extracted from convolutional layers 126 of object detection CNN 101. That is, feature maps from convolutional layers 126 may be copied and stacked to form features volume 130, which includes a volume of pixel wise features. For example, for each pixel, a column of features (one from each of the extracted feature maps) may be characterized as a hypercolumn. The hypercolumns, taken together, provide a volume of pixel wise features for current video frame 111.

Figure 2:
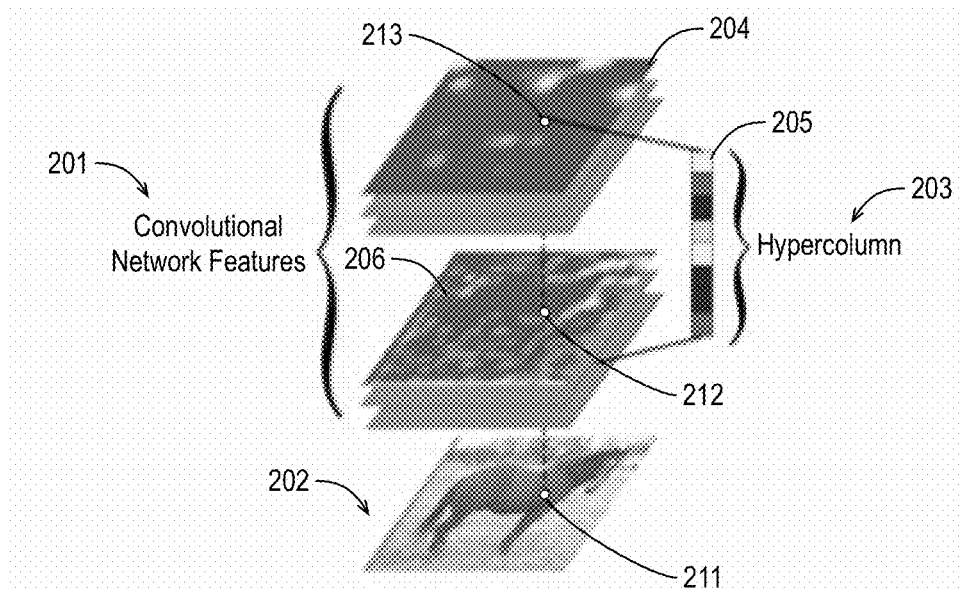
FIG. 2 illustrates an example volume of convolutional network features for an input image from feature layers of an object classification convolutional neural network as applied to the input image.

FIG. 2 illustrates an example volume of convolutional network features 201 for an input image 202 from feature layers of an object classification convolutional neural network as applied to input image 202, arranged in accordance with at least some implementations of the present disclosure. In FIG. 2, each feature map of convolutional network features 201 such as feature maps 204, 206 are extracted from object detection CNN 101 after application of object detection CNN 101 to input image 202. For example, volume of convolutional network features 201 is an example of features volume 130. As shown with respect to pixel 211 of input image 202, each feature map of convolutional network features 201 such as feature maps 204, 206 has a corresponding feature or feature value such as feature value 213 of feature map 204 and feature value 212 of feature map 206 and so on such that, for pixel 211 a hypercolumn 203 of feature values 205 is provided. The hypercolumns, including hypercolumn 203, provide a volume of convolutional network features 201 that are compressed to generate, with reference to FIG. 1, feature frames 119 via feature compression module 103. As discussed, hypercolumn 203 may have a large number of entries such as about 1400 values.

Returning to FIG. 1, features volume 130 include, as discussed with respect to volume of convolutional network features 201, per pixel hypercolumn deep features generated from object detection CNN 101. Features volume 130 are then compressed to generate feature frames 119. Feature frames 119 may have the same resolution as current video frame 111 (e.g., horizontal and vertical dimensions equal to current video frame 111) and a depth, D, that is a fraction of the number of entries in each per pixel hypercolumn of features volume 130 such as 50% of the number entries or the like.

The compression of features volume 130 to generate feature frames 119 (e.g., a features volume having a reduced depth) may be performed using any suitable technique or techniques. Notably, feature frames 119 may also be characterized as having per pixel hypercolumn deep features, although they are compressed features from layers of an object classification CNN. In some embodiments, feature frames 119 are generated via compression using Tucker decomposition of features volume 130. For example, per pixel hypercolumn deep features (feature frames 119) may be generated from compressed (via Tucker decomposition) object detection CNN 101 (e.g., VGG-19) features.

Figure 3:
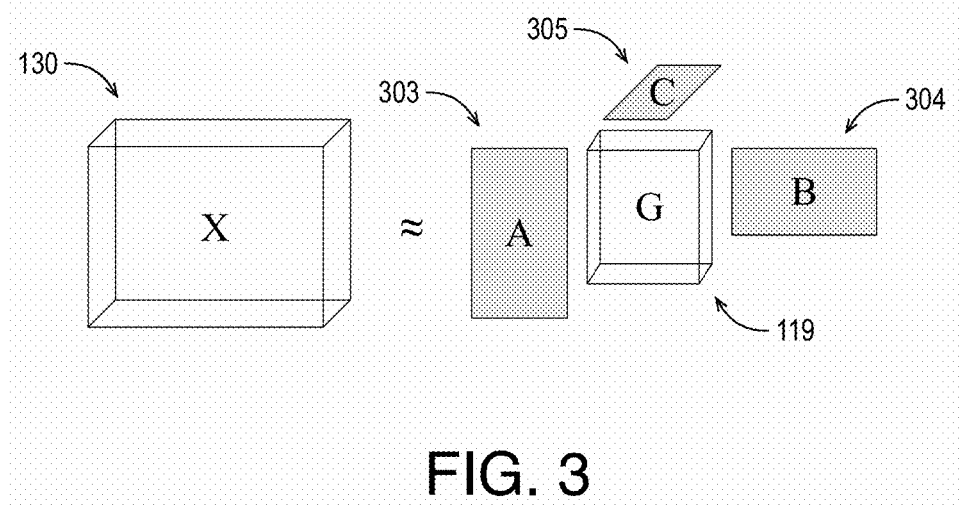
FIG. 3 illustrates an example compression of a features volume to generate feature frames for a CNN input.

FIG. 3 illustrates an example compression of features volume 130 to generate feature frames 119 for CNN input 121, arranged in accordance with at least some implementations of the present disclosure. As shown in FIG. 3, features volume 130 (X) (e.g., as extracted from object detection CNN 101) may be approximated by feature frames 119 (G) and principal components 303, 304, 305 (A, B, C). Notably, principal components 303, 304, 305 may be discarded while feature frames 119 are provided as part of CNN input 121.

For example, Tucker decomposition is an example of higher order singular value decomposition (HOSVD) that may be applied to compress features volume 130 to feature frames 119. Notably, Tucker decomposition is applied with pre-training with respect to segmentation CNN 401 to perform dimensionality reduction while preserving the needed details for use by features volume 130. Such pre-training of feature compression via Tucker decomposition may be performed using any suitable technique or techniques. In an embodiment, principal components 303, 304, 305 are selected during a training phase for application in an inference phase, although any suitable parameters of the Tucker decomposition may be modified during the pre-training.

For example, for a 3-tensor (e.g., a 3D tensor as provided here), Tucker decomposition may be framed as a problem of finding a decomposition of tensor X (e.g., features volume 130) such that $X \in \mathbb{R}^{I \times J \times K}$ (e.g., X has real numbers with a volume dimension of I×J×K) with a core tensor G (feature frames 119) such that $G \in \mathbb{R}^{P \times Q \times R}$ (e.g., G has real numbers with a volume dimension of P×Q×R), and principal components A (e.g., principal component 303) such that $A \in \mathbb{R}^{I \times P}$ (e.g., A has real numbers with an area dimension of I×P), B (e.g., principal component 304) such that $B \in \mathbb{R}^{J \times Q}$ (e.g., B has real numbers with an area dimension of J×Q), and C (e.g., principal component 305) such that $C \in \mathbb{R}^{K \times R}$ (e.g., C has real numbers with an area dimension of K×R) using Equation (2) as follows. Notably, in this context, K is about 1400 (the number or extracted feature maps), R is about 700 (e.g., using 50% compression), and I=P and J=Q where I×J is the resolution of input video frame 111 (and other frames of CNN input 121). In some embodiments, the Tucker decomposition may be determined as shown with respect to Equation (2):

$$\min_{\hat{X}} \|X - \hat{X}\| \text{ with } \hat{X} = \sum_{p=1}^{P} \sum_{q=1}^{Q} \sum_{r=1}^{R} g_{pqr} a_r e b_r e c_r = G x_1 A x_2 B x_3 C$$

where e denotes an outer product, G is the core tensor (feature frames 119), and A, B, C, are factor matrices or principal components in the respective tensor mode, and where the metricized version of $\hat{X}$ may be expressed as shown in Equations (3):

$$\hat{X}_{(1)} = AG_{(1)}(C \otimes B)^T$$
$$\hat{X}_{(2)} = BG_{(1)}(C \otimes A)^T$$
$$\hat{X}_{(3)} = CG_{(1)}(B \otimes A)^T \quad (3)$$

where $\otimes$ indicates a Kronecker product.

Generally, compression is achieved when P<I, Q<J, and/or R<K (e.g., with the core tensor, G, being the compressed version of the original tensor, X). As discussed, in the context of compressing features volume 130 to feature frames 119, compression is only provided in one dimension (e.g., the depth or number of feature maps).

Figure 4:
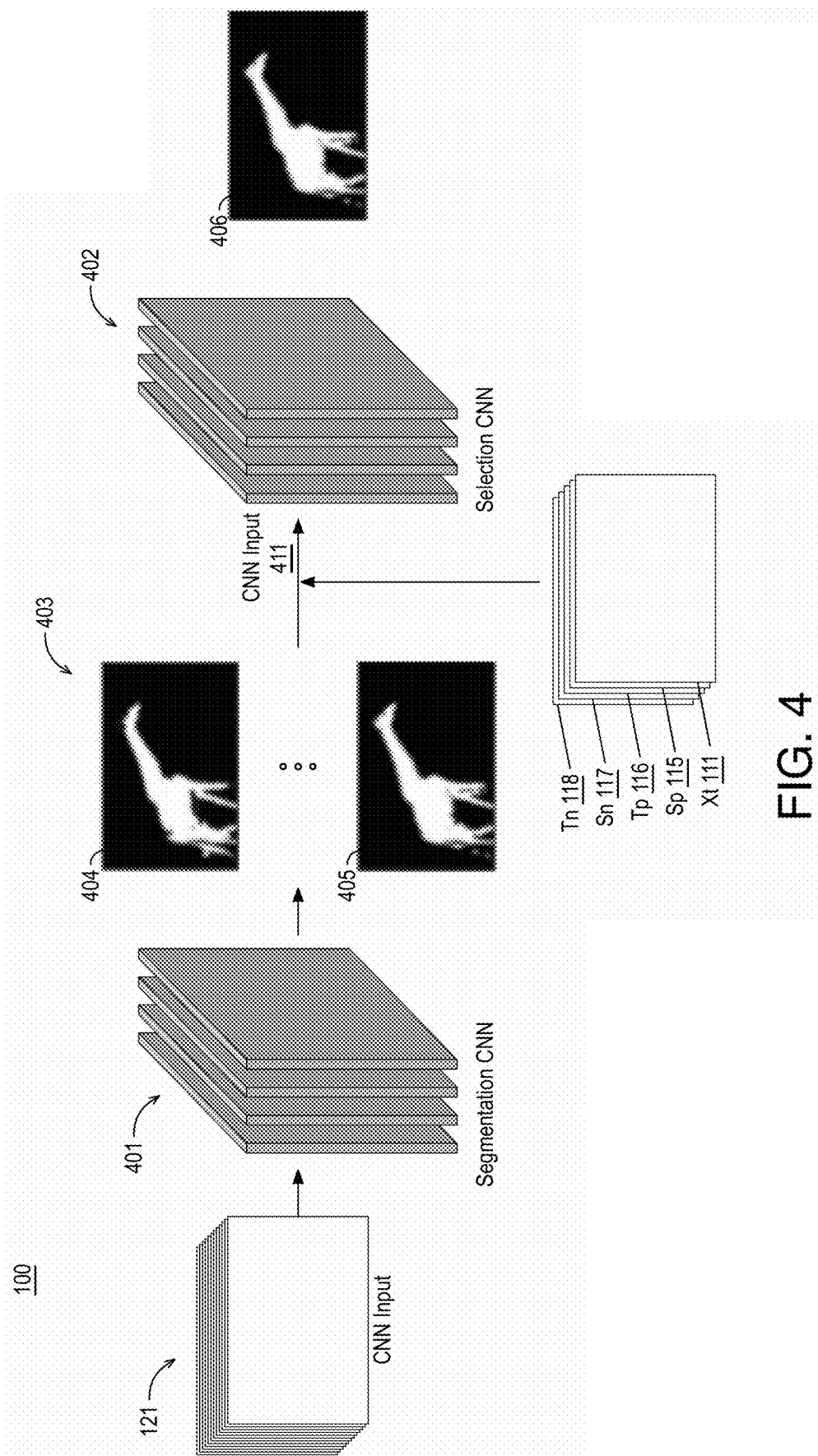
FIG. 4 illustrates generation of example segmentations and selection of a final segmentation by an example system.

FIG. 4 illustrates generation of example segmentations 403 and selection of a final segmentation 406 by example system 100, arranged in accordance with at least some implementations of the present disclosure. As shown CNN input 121, generated as discussed above, may be input to segmentation CNN 401 to generate multiple candidate segmentations 403 current video frame 111. As discussed, the term segmentation CNN indicates a CNN that generates multiple candidate segmentations 403 (e.g., a set of segmentations) based on a CNN input such that each of the multiple candidate segmentations indicates a probability that each pixel thereof is in an object of interest.

Segmentation CNN 401 may include any CNN architecture having any number convolutional layers each having convolutional kernels of any size, number, and dilation. Furthermore, some of the convolutional layers may be followed by rectified linear units and, after a final convolutional layer thereof segmentation CNN 401 may include an activation layer or activation function layer to provide pixel wise probabilities that each pixel is in the object of interest. For example, the output of segmentation CNN 401 may include any number (e.g., about six) candidate segmentations 403 that each include pixel wise probabilities as to whether the pixel is included in the object of interest as discussed above. Notably, candidate segmentations 403 may advantageously include probabilities over a particular range (e.g., 0 to 1, inclusive) for use by selection CNN as discussed below. In an embodiment, candidate segmentations 403 are further ranked by likelihood of the accuracy of each of candidate segmentations 403 such that, for example, a most likely segmentation 404 is provided first in the listing, a second most likely segmentation is provided second in the listing, and so on through a least likely segmentation 405. Such ranking or ordering may be maintained in the application of selection CNN 402.

In an embodiment, segmentation CNN 401 has a CNN architecture as outlined by Table 1 below such that segmentation CNN 401 has 9 layers followed by an activation function layer as discussed above. As shown, a first convolutional layer may apply 75 1×1 convolution kernels at dilation 1, second through eighth convolutional layers may apply 75 3×3 convolution kernels at increasing dilations of 1, 4, 8, 16, 32, 64, and 128, and a ninth convolutional layer may apply 75 1×1 convolution kernels at dilation 1.

TABLE 1

Example Segmentation Network Architecture

| | Layer | | | | | | | | |
|---|---|---|---|---|---|---|---|---|---|
| | 1 | 2 | 3 | 4 | 5 | 6 | 7 | 8 | 9 |
| Convolution | 1 × 1 | 3 × 3 | 3 × 3 | 3 × 3 | 3 × 3 | 3 × 3 | 3 × 3 | 3 × 3 | 1 × 1 |
| Dilation | 1 | 1 | 4 | 8 | 16 | 32 | 64 | 128 | 1 |
| Depth | 75 | 75 | 75 | 75 | 75 | 75 | 75 | 75 | 75 |

Segmentation CNN 401 implements CNN parameters that were pretrained as discussed herein below. Notably, segmentation CNN 401 may be trained with selection CNN 402 or they may be separated separately.

As shown in FIG. 4, in some embodiments, candidate segmentations 403 along with video frame 111 (Xt), object of interest indicator frame 115 (Sp), background indicator frame 117 (Sn), positive distance transform frame 116 (Tp), and negative distance transform frame 118 (Tn) are provided as CNN input 411 to selection CNN 402 for the selection of selected segmentation 406. In some embodiments, one or more of previous video frame 112 (Xt−1), motion frame 113 (MVt), and previous segmentation frame 114 (Mt−1) may also be provided as part of CNN input 411. Selection CNN 402 may have any suitable architecture to provide selection of selected segmentation 406. In an embodiment, selection CNN 402 has a similar architecture with respect to segmentation CNN 401 as discussed with respect to Table 1. Although illustrated with respect to implementation of selection CNN 402, any selection technique may be used to determine selected segmentation 406. Furthermore, a threshold (e.g., 0.5) may then be applied to final segmentation 406 to provide a binary mask with values of 0 for pixels deemed to be outside of the object of interest and values of 1 for pixels deemed to be included in the object of interest.

Figure 5:
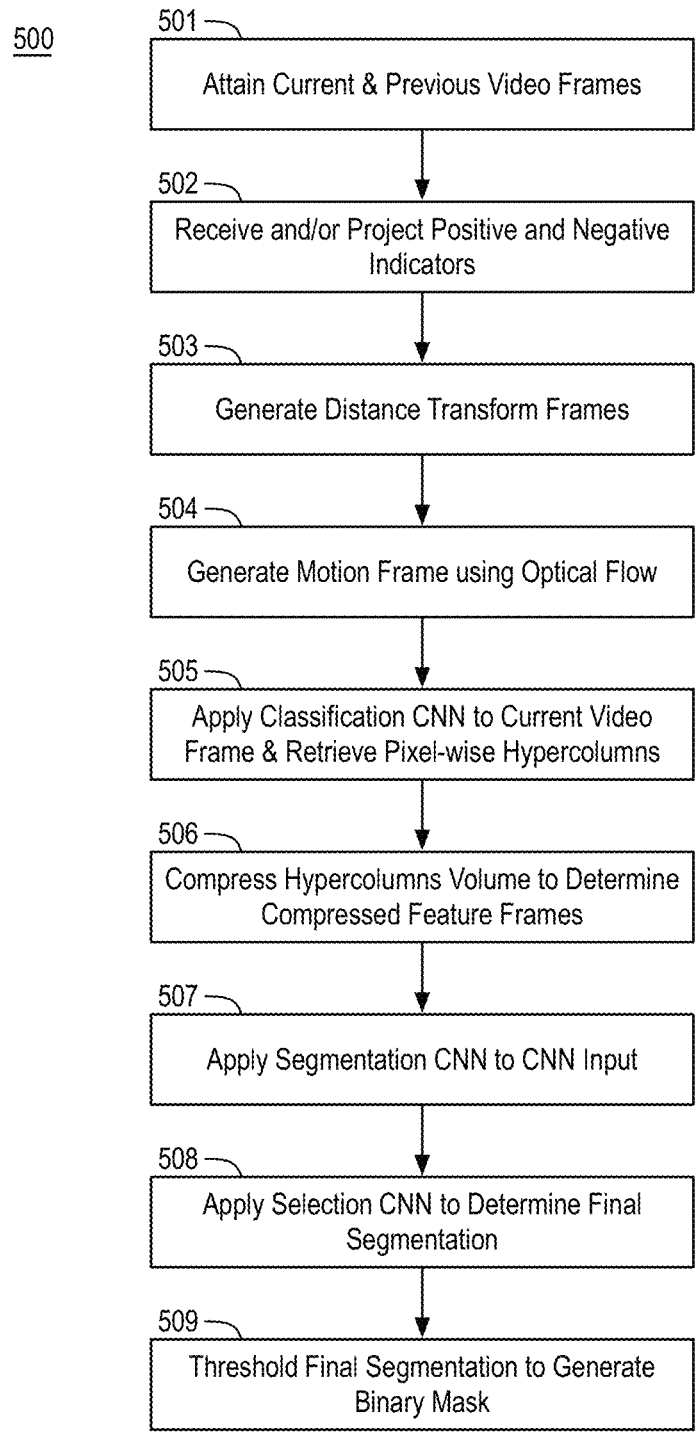
FIG. 5 is a flow diagram illustrating an example process for generating a segmentation mask from input video and user object and background selection.

FIG. 5 is a flow diagram illustrating an example process 500 for generating a segmentation mask from input video and user object and background selection, arranged in accordance with at least some implementations of the present disclosure. Process 500 may include one or more operations 501-509 as illustrated in FIG. 5. Process 500 may be performed by any device or system discussed herein to generate a segmentation mask. Process 500 or portions thereof may be repeated for any number of current video frames, video sequences, etc. The resultant segmentation mask may be further used in any visual effects application such as rotoscoping operations.

Process 500 begins at operation 501, where a current video frame and a temporally previous video frame (in capture and presentation order) are attained. The current video frame and the temporally previous video frame may each include a single luma channel frame or multiple (e.g., three) planes or frames such as a luma frame and two chroma frames (e.g., YUV, YCbCr) or three chroma frames (e.g., RGB). Notably, the CNN input discussed with respect to operation 507 may include three frames or feature maps for each of the current video frame and the temporally previous video frame.

Processing continues at operation 502, where positive and negative indicators representative of locations within an object of interest are received or projected. For example, for a first video frame of a video sequence, the positive and negative indicators may be provided by a user while, for subsequent video frames of the video sequence, the positive and negative indicators may be projected using optical flow techniques. Furthermore, at operation 502, an object of interest frame or positive locations frame and a background frame or negative locations frame corresponding to the positive and negative indicators, respectively, may be generated such that the positive locations frame indicates (via a value such as one) locations of the positive indicators and the negative locations frame indicates (via a value such as one) locations of the negative indicators with other values of the frame values corresponding to not indication (e.g., using a value of zero).

Processing continues at operation 503, where distance transform frames, one each corresponding to the positive locations frame and the negative locations frame, are generated. For example, positive and negative distance transform frames may be generated as discussed with respect to Equations (1) such that the positive distance transform frame includes, for each pixel thereof, a value indicative of a minimum distance to any of the locations of the positive indicators and the negative distance transform frame includes, for each pixel thereof, value indicative of a minimum distance to any of the locations of the negative indicators.

Processing continues at operation 504, where a motion frame is generated using any suitable motion tracking techniques such as dense optical flow techniques. In other embodiments, motion estimation techniques such as block matching techniques may be used. As discussed, the motion frame includes motion indicators indicative of motion from the previous video frame to the current video frame such as per pixel velocity motion vectors (e.g., a motion vector for each pixel of the motion frame).

Processing continues at operation 505, where a classification CNN is applied to the current video frame and pixel wise hypercolumns are retrieved. The classification CNN may be any suitable CNN such as the VGG-19 pretrained CNN. Furthermore, the pixel wise hypercolumns may include feature values from any layers (e.g., hidden layers) of the pretrained CNN. Each hypercolumn includes a number of features for each pixel (e.g., about 1400 features or values) that span across feature maps such that each pixel has a feature value in each feature map as illustrated with respect to FIG. 2. The retrieved hypercolumns and feature maps may be viewed as a volume with two dimensions corresponding to the dimensions of each feature map and a third dimension (e.g., depth) corresponding to the dimension of each hypercolumn (and the number feature maps).

Processing continues at operation 506, where the hypercolumns volume retrieved at operation 505 is compressed to generate feature frames of compressed features. For example, such compression reduces the dimensionality of the depth of the hypercolumns volume (e.g., the number of feature maps) while maintaining the two dimension corresponding to the dimensions of each feature map. The compression may be performed using any suitable technique or techniques such as Tucker decomposition. In an embodiment, compressing the hypercolumns includes applying Tucker decomposition to a feature volume including the hypercolumns (e.g., the retrieved hypercolumns volume) to determine a core tensor that the compressed feature frames.

Processing continues at operation 507, where a segmentation CNN is applied to a CNN input including a combination of the current video frame, the temporally previous video frame, the positive indicator frame, the negative indicator frame, distance transform frames, the motion frame, and the feature frames of features compressed from the layers of the classification CNN as applied to the current video frame. The segmentation CNN provides candidate segmentations of the current video frame as discussed herein and is pre-trained as discussed further with respect to FIG. 6 below. In some embodiments, the segmentation CNN is pretrained using a loss function including a boundary loss term including a difference between ground truth values for ground truth boundary points corresponding to a training object of interest and resultant values for the boundary points corresponding to application of the segmentation convolutional neural network during training.

Processing continues at operation 508, where a selection CNN is applied to another CNN input volume including, for example, the current video frame, the user input frame, and the plurality of candidate segmentations. The selection CNN may have any suitable architecture such as an architecture similar to that of the segmentation CNN. The candidate segmentations and the selected final segmentation may include pixel wise probabilities that each pixel is included in the objection of interest such as a value from zero to one, inclusive.

Processing continues at operation 509, where the final segmentation may be thresholded using any suitable threshold such as 0.5 to generate a binary segmentation mask with first indicators or values (e.g., values of one) indicating pixels deemed to be within the object of interest. For example, values of the final segmentation below 0.5 may be deemed to be background and assigned a second indicator or value (e.g., a value of zero) while values of the final segmentation greater than or equal to 0.5 may be deemed to be part of the object of interest and assigned the first indicator or value. The final segmentation and/or the binary segmentation mask may be used in any suitable context such as visual effects, rotoscoping, etc. Notably, the binary segmentation mask may be used to attain pixels (e.g., by overlaying with respect to the current video frame) of the object of interest to extract the object of interest. The extracted the object of interest may then be placed on a different background, manipulated, etc.

Figure 6:
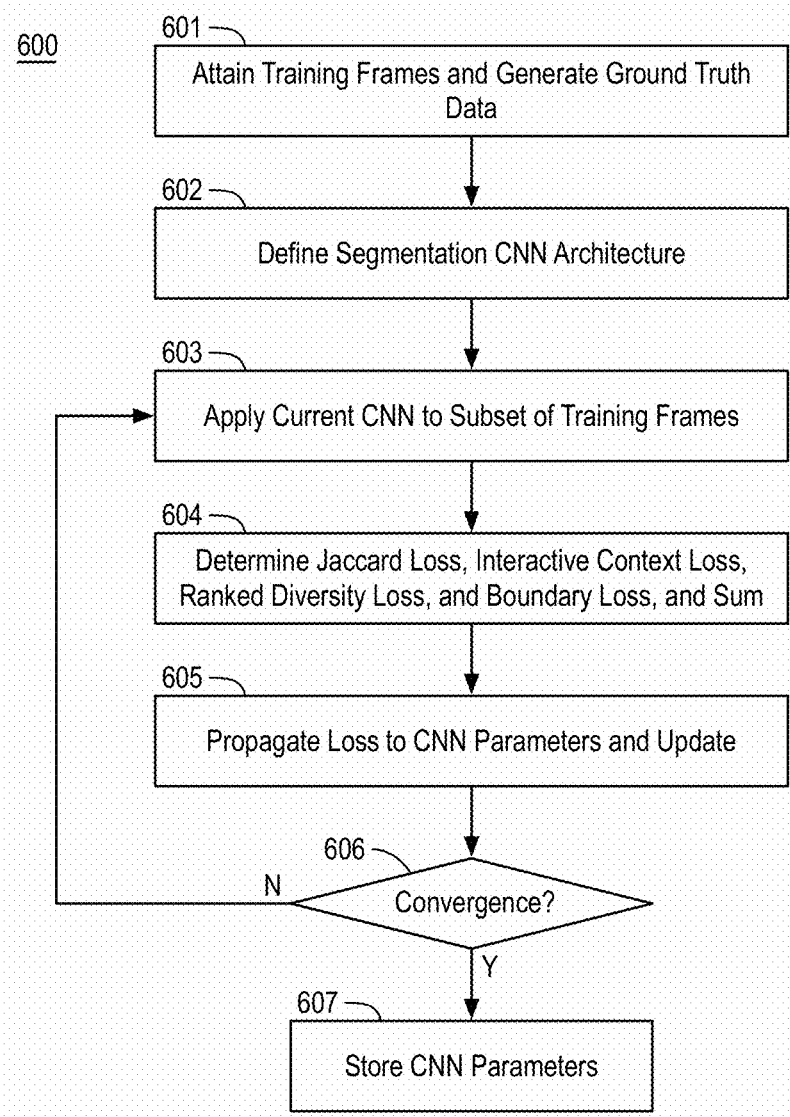
FIG. 6 is a flow diagram illustrating an example process for training a segmentation convolutional neural network.

FIG. 6 is a flow diagram illustrating an example process 600 for training a segmentation convolutional neural network, arranged in accordance with at least some implementations of the present disclosure. Process 600 may include one or more operations 601-607 as illustrated in FIG. 6. Process 500 may be performed by any device or system discussed herein to train any segmentation CNN and/or selection CNN discussed herein. Process 600 or portions thereof may be repeated for any training, training sets, etc. The parameter weights generated by process 600 may be stored to memory and implemented via a processor, for example, to generate segmentations and segmentation masks for video frames as discussed herein.

Process 600 begins at operation 601, where training frames are attained and ground truth data for the training frames is generated. The training frames may include any number of training sets of video sequences having the characteristics discussed herein. For example, it is desirable that the training frames have the same or similar characteristics with respect to the expected frames that will be attained during inference. In some embodiments, the ground truth data includes an indication, for each pixel of each of the training frames as to whether the pixel is part of an object of interest or part of a background. Such ground truth data may be binary for example with a value of one for pixels that are part of the object of interest and a value of zero for other pixels (e.g., background pixels).

Processing continues at operation 602, where an architecture of the segmentation CNN is defined. The segmentation CNN architecture may include any characteristics such as those discussed herein with respect to segmentation CNN 401. Furthermore, an architecture of a selection CNN architecture may also be performed at operation 602. Notably, a segmentation CNN and a selection CNN may be trained together or they may be trained separately in the following discussion.

Processing continues at operation 603, where the current segmentation CNN is applied to at least some of the training frames. For example, the training of the segmentation CNN may be an iterative process such that, at each training epoch, parameters of the segmentation CNN including convolutional kernel filter weights, activation function weights, and so on are updated based on a loss function discussed at operation 604. The current segmentation CNN is then updated and so on until convergence. At the first iteration of operation 603, the segmentation CNN may be initiated with parameters and weights using any suitable technique or techniques such as random application of weights within certain boundaries, setting weights as average weights, etc.

Processing continues at operation 604, where based on the results from application of the current segmentation CNN at operation 603, a loss is determined based on a loss function. As shown in FIG. 6, in some embodiments, the loss applied loss function sums a Jaccard loss, an interactive content loss, ranked diversity loss, and a boundary loss as discussed further below. In other embodiments, one or more of the losses just described may be discarded and/or additional losses may be used. Notably, the loss function applied at operation 604 includes a boundary loss to strongly encourage boundary points in the candidate segmentations generated by the segmentation CNN to match the ground truth boundary points.

As discussed, in some embodiments, the loss function includes a sum of a Jaccard loss, an interactive content loss, ranked diversity loss, and a boundary loss. In some embodiments, the loss function is applied based on Equation (4) as follows:

$$L_f(\theta_f) = \sum_i \min_m \{l(Y_i, f_m(X_i; \theta_f))\} + l_{IC}(S_p^i, S_n^i, f_m(X_i; \theta_f)) + \sum_i \sum_{m=1}^{M} \lambda_m l(Y_i, f_m(X_i; \theta_f)) + \sum_i \sum_{m=1}^{M} l_{\partial-PHL}(Y_i, f_m(X_i; \theta_f)) \qquad (4)$$

where the first term after the equal sign is the Jaccard loss, the second term is the interactive content loss, the third term is the ranked diversity loss, and the fourth term is the boundary loss. The loss function illustrated with respect to Equation (4) may be characterized as a total loss function.

As discussed, the term 1 ($Y_i$, $f_m(X_i; \theta_f)$) indicates Jaccard loss (or relaxed Jaccard loss), where l indicates the loss $Y_i$ indicates a ground truth frame, $f_m$ indicates m candidate segmentations f, $X_i$ is the current input frame, and $\theta_f$ represents the current parameters of the segmentation CNN. In some embodiments, the relaxed Jaccard loss is defined as follow in Equation (5):

$$l(Y, f(X_i; \theta_f)) = 1 - \frac{\sum_p \min(Y(p), f(p))}{\sum_p \max(Y(p), f(p))} \quad (5)$$

where Y(p) represents the value of the ground truth segmentation at pixel location (or point) p in the ground truth frame, and f(p) represents the segmentation CNN output at pixel location (or point) p. For example, relaxed Jaccard is similar to an intersection over union metric that provides less loss when the segmented regions of interest have better overlap.

The term $l_{IC}$ ($S_p^i, s_n^i, f_m(X_i; \theta_f)$) indicates interactive content loss that is defined as a constraint with respect to input indicators (e.g., input click locations) and the corresponding distance transform frames as discussed herein. In some embodiments, the interactive content loss is defined as follows in Equation (6):

$$l_{IC}(S_p, S_n, f(X_i; \theta_f)) = \|S_p * (S_p - f(X_i; \theta_f))\|_l + \|S_n * (S_n - (1 - f(X_i; \theta_f)))\|_l \quad (6)$$

where * indicates the Hadamard (e.g., entry-wise product). Notably, the interactive content loss penalizes inaccurate results with respect to the discussed user input locations.

The term $\lambda_m l(Y_i, f_m(X_i; \theta_f))$ indicates ranked diversity loss and serves to encourage the segmentation CNN to produce visually diverse segmentations and to apply an intrinsic ranking to the segmentations. Such a condition is favorable due to the multi-modality intrinsic to semantic segmentation problems. Furthermore, the condition may be directly imposed on the segmentation CNN by choosing a scalar set $\{\lambda_m\}$ to foster an arbitrary ranking that must be resolved by the segmentation CNN itself.

Finally, the term $l_{\partial-PHL}(Y_i, f_m(X_i; \theta_f))$ indicates a boundary loss function such that losses at boundary pixels are penalized and the segmentation CNN is encouraged to have boundary points match the ground truth. For example, for boundary pixels (as defined by the ground truth data), a loss as determined based on the difference between the ground truth value for the boundary pixel (e.g., a value of one) and the segmentation value for the boundary pixel (e.g., a probability ranging from zero to one, inclusive). As used herein, the term boundary pixel indicates a pixel within an object of interest such that at least adjacent pixel to the boundary pixel is outside the object of interest (and, often, at least one other adjacent pixel is within the object of interest). For example, a segmentation CNN is pretrained using a loss function including a boundary loss term that includes a difference between ground truth values for ground truth boundary points corresponding to a training object of interest and resultant values for the boundary points corresponding to application of the segmentation convolutional neural network during training. In some embodiments, the boundary loss term includes a pseudo Huber loss term including a square of a fraction of the difference over a steepness parameter, the steepness parameter to penalize boundary segmentation errors in the segmentation convolutional neural network. In some embodiments, the boundary loss term includes a pseudo Huber loss as defined by Equation (7):

$$l\partial\text{-}PHL(Y, f(X_i; \theta_f)) = \delta^2(\sqrt{1 + ((Y(\partial_Y(p)) - f(\partial_Y(p)))/\delta)^2} - 1) \quad (7)$$

where $l_{\partial-PHL}$ is he pseudo Huber loss, Y represents the ground truth segmentation, Y ($\partial_Y(p)$) represents the value of the ground truth segmentation at a boundary pixel ($\partial_Y$) location (or point) p in the ground truth frame, $f(\partial_Y(p))$ represents the segmentation CNN output at the corresponding boundary pixel location, and $\delta$ is a steepness parameter. For example, relaxed Jaccard is similar to an intersection over union metric that provides less loss when the segmented regions of interest have better overlap. As shown, the pseudo Huber loss includes differences between ground truth values for ground truth boundary points corresponding to a training object of interest ($Y(\partial_Y(p))$) and resultant values for the boundary points corresponding to application of the segmentation convolutional neural network during training ($f(\partial_Y(p))$). Furthermore, the boundary loss term includes a square of a fraction of the difference over a steepness parameter ($((Y(\partial_Y(p)) - f(\partial_Y(p)))/\delta)^2$), the steepness parameter to penalize boundary segmentation errors in the segmentation convolutional neural network. The steepness parameter may be any value and may be determined using heuristic techniques.

As discussed, the total loss may be determined based on summing the discussed loss terms.

Processing continues at operation 605, where the loss is propagated through the segmentation CNN. The loss may be propagated through the segmentation CNN using any suitable technique or techniques such as back propagation techniques. Notably, the weights and the parameters of the segmentation CNN may be adjusted based on the loss to generate a now current segmentation CNN.

Processing continues at decision operation 606, where a determination is made as to whether convergence of the segmentation CNN has been attained. The convergence decision may be made using any suitable technique or techniques such as a total loss of the segmentation CNN being less than a predetermined threshold, a maximum number of training epochs being performed, etc. If convergence has not been met, processing continues at operations 603-606 until convergence is attained.

After convergence has been attained, processing continues at operation 607, where the weights and parameters of the segmentation CNN are stored to memory for application via a system such as system 100 or any other system of device discussed herein.

FIG. 7 illustrates example input video frames 701, 711 for segmentation and corresponding final segmentations 702, 712, respectively, arranged in accordance with at least some implementations of the present disclosure. Notably, final segmentations 702, 712 may be generated using the techniques discussed herein. In the examples of FIG. 7, final segmentations 702, 712 illustrate binary masks with white representative of an object of interest and black representative of a background as used herein throughout. As shown, final segmentations 702, 712 faithfully represent the objects of interest in input video frames 701, 711. Furthermore, final segmentations 702, 712 yield high fidelity segmentation results with smooth and accurate boundary contours and temporally coherence from frame to frame throughout video (both in terms of fidelity and reduced chatter). Segmentations 702, 712 further provide high fidelity segmentation results at The discussed techniques provide improved semantic segmentation in video including optional use of 2K inference (for enhanced resolution), low user input segmentation (e.g., only requiring positive and negative clicks on a first frame of a video sequence) with automation based on projection of the initial user input, an application driven tensor decomposition as applied to features extracted from a classification CNN for reduced memory usage and computational complexity, implementation of a boundary loss function to render segmentations with high quality boundary contours, and improved temporal coherence via use of motion data such as optical flow data.

Figure 8:
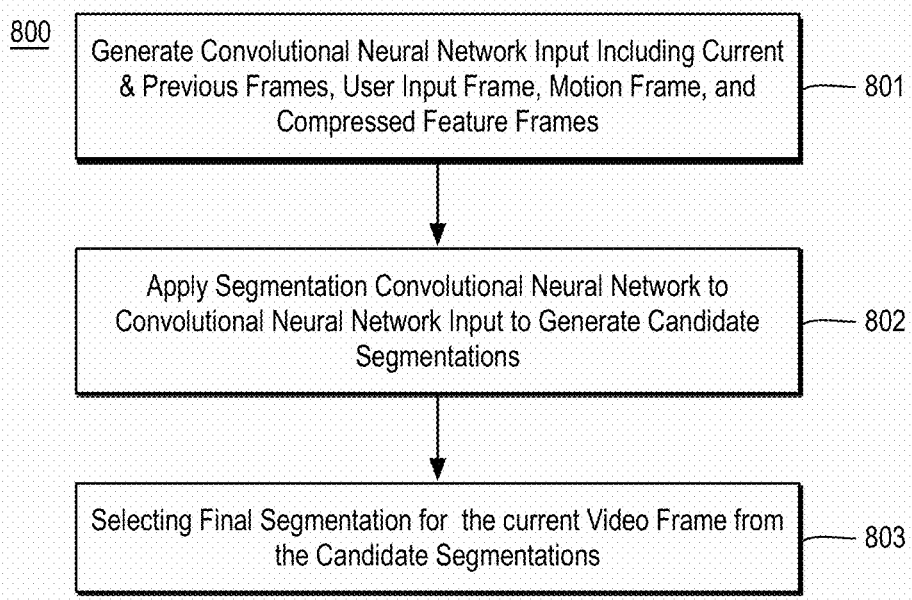
FIG. 8 is a flow diagram illustrating an example process for providing segmentation in video.

FIG. 8 is a flow diagram illustrating an example process 800 for providing segmentation in video, arranged in accordance with at least some implementations of the present disclosure. Process 800 may include one or more operations 801-803 as illustrated in FIG. 8. Process 800 may form at least part of a video segmentation process. As used herein, the term video segmentation indicates segmenting one or more video frames of the video such that each pixel (or small pixel regions) of the video frames include probabilities of whether the pixel is within a particular region (e.g., object of interest region, primary region, etc.) of the video frame. By way of non-limiting example, process 800 may form at least part of a video segmentation process performed by system 100 as discussed herein during an implementation or inference phase. Furthermore, process 800 will be described herein with reference to system 900 of FIG. 9.

Figure 9:
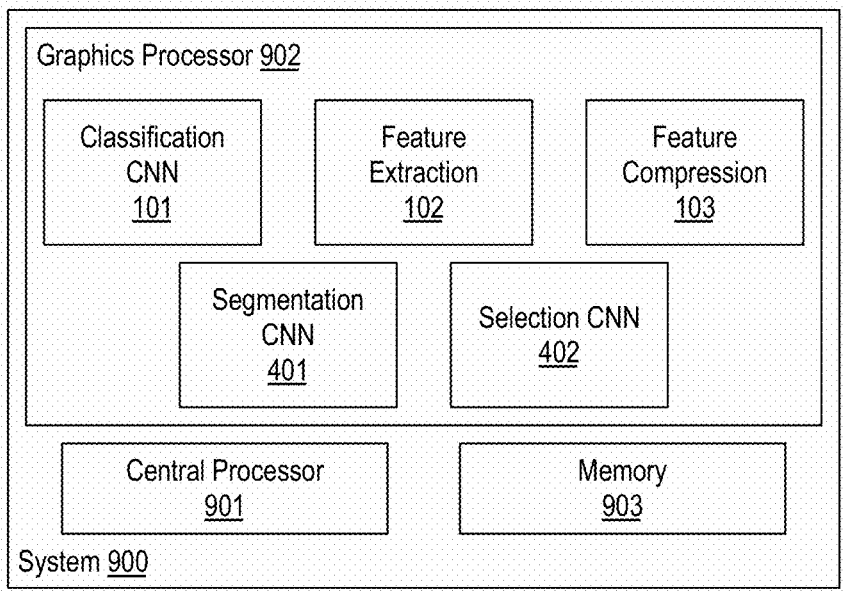
FIG. 9 is an illustrative diagram of an example system for providing segmentation in video.

FIG. 9 is an illustrative diagram of an example system 900 for providing segmentation in video, arranged in accordance with at least some implementations of the present disclosure. As shown in FIG. 9, system 900 may include one or more central processing units (CPU) 901 (i.e., central processor(s)), a graphics processing unit 902 (i.e., graphics processor), and memory stores 903. Also as shown, graphics processing unit 902 may include or implement classification CNN 101, feature extraction module 102, feature compression module 103, segmentation CNN 401, and selection CNN 402. Such modules or components may be implemented to perform operations as discussed herein. In the example of system 900, memory stores 903 may store video frame data, motion data, segmentation data, feature frame data, user input data, object of interest indicator or background indicator frame data, positive or negative distance transform frame data, feature map data, CNN parameters or weights, or any other data or data structure discussed herein.

As shown, in some examples, classification CNN 101, feature extraction module 102, feature compression module 103, segmentation CNN 401, and selection CNN 402 are implemented via graphics processing unit 902. In other examples, one or more or portions of classification CNN 101, feature extraction module 102, feature compression module 103, segmentation CNN 401, and selection CNN 402 are implemented via central processing units 901 or an image processing unit (not shown) of system 900. In yet other examples, one or more or portions of classification CNN 101, feature extraction module 102, feature compression module 103, segmentation CNN 401, and selection CNN 402 may be implemented via an imaging processing pipeline, graphics pipeline, or the like.

Graphics processing unit 902 may include any number and type of graphics processing units that may provide the operations as discussed herein. Such operations may be implemented via software or hardware or a combination thereof. For example, graphics processing unit 902 may include circuitry dedicated to manipulate video data, CNN data, etc. obtained from memory stores 903. Central processing units 901 may include any number and type of processing units or modules that may provide control and other high level functions for system 900 and/or provide any operations as discussed herein. Memory stores 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 903 may be implemented by cache memory. In an embodiment, one or more or portions of classification CNN 101, feature extraction module 102, feature compression module 103, segmentation CNN 401, and selection CNN 402 are implemented via an execution unit (EU) of graphics processing unit 902. The EU may include, for example, programmable logic or circuitry such as a logic core or cores that may provide a wide array of programmable logic functions. In an embodiment, one or more or portions of classification CNN 101, feature extraction module 102, feature compression module 103, segmentation CNN 401, and selection CNN 402 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of classification CNN 101, feature extraction module 102, feature compression module 103, segmentation CNN 401, and selection CNN 402 are implemented via an application specific integrated circuit (ASIC). The ASIC may include an integrated circuitry customized to perform the operations discussed herein.

Returning to discussion of FIG. 8, process 800 begins at operation 801, where a convolutional neural network input is generated. In some embodiments, the convolutional neural network input includes a current video frame, a temporally previous video frame, an object of interest indicator frame including one or more indicators of an object of interest in the current video frame, a motion frame including motion indicators indicative of motion from the previous video frame to the current video frame, and multiple feature frames each including features compressed from layers of an object classification convolutional neural network as applied to the current video frame. In some embodiments, the convolutional neural network input further includes a previous segmentation frame corresponding to the previous video frame. In an embodiment, the current video frame includes per pixel R, G, or B values. In an embodiment, the CNN input includes one frame each including per pixel R, G, and B values. Similarly, the previous video frame may include one frame each including per pixel R, G, and B values. In an embodiment, the motion frame includes per pixel velocity motion vectors. In an embodiment, each of the feature frames includes per pixel compressed feature values.

In some embodiments, process 800 further includes applying the classification convolutional neural network to the current video frame, retrieving, for each pixel of the current video frame, a plurality of feature values each from one of the layers of the classification convolutional neural network to generate a hypercolumn of feature values for each pixel, and compressing the hypercolumns to determine the plurality of feature frames. In an embodiment, compressing the hypercolumns comprises applying Tucker decomposition to a feature volume including the hypercolumns to determine a core tensor comprising the plurality of compressed feature frames. In some embodiments, a number of the compressed feature frames is not more than half of a number of feature values in each hypercolumn.

In some embodiments, process 800 further includes receiving one or more user click indicators corresponding to one or more first locations in the temporally previous video frame and projecting each of the one or more first locations to one or more second locations in the current video frame using the motion frame to determine the one or more indicators of the object of interest in the current video frame. In some embodiments, the one or more indicators of the object of interest indicator frame indicate locations of positive indicators indicative of the object of interest. In some embodiments, the convolutional neural network input further includes one or more of a background indicator frame including negative indicators indicative of locations of a background exclusive of the object of interest, a positive distance transform frame including, for each pixel thereof, a value indicative of a minimum distance to any of the locations of the positive indicators, and a negative distance transform frame including, for each pixel thereof, value indicative of a minimum distance to any of the locations of the negative indicators.

Processing continues at operation 802, where a segmentation convolutional neural network is applied to the convolutional neural network input to generate multiple candidate segmentations of the current video frame. In an embodiment, each of the candidate segmentations includes per pixel probability values indicating a probability each pixel is a member of the object of interest. The segmentation convolutional neural network may include any characteristics discussed herein. In an embodiment, the segmentation convolutional neural network is pretrained using a loss function including a boundary loss term, the boundary loss term including differences between ground truth values for ground truth boundary points corresponding to a training object of interest and resultant values for the boundary points corresponding to application of the segmentation convolutional neural network during training. In an embodiment, the boundary loss term includes a pseudo Huber loss term including a square of a fraction of the difference over a steepness parameter, the steepness parameter to penalize boundary segmentation errors in the segmentation convolutional neural network.

Processing continues at operation 803, where one of the candidate segmentations is selected as a final segmentation corresponding to the current video frame. The final segmentation may be selected using any suitable technique or techniques. In an embodiment, selecting the final segmentation from the candidate segmentations includes applying a selection convolutional neural network to a second convolutional neural network input includes the current video frame, the user input frame, and the plurality of candidate segmentations. The final segmentation (e.g., including per pixel probability values indicating a probability each pixel is a member of the object of interest) may optionally be thresholded to generate a binary segmentation mask.

Process 800 may provide for generation of candidate segmentations and selection of a final segmentation from the candidate segmentations for a current video frame. Process 800 may be repeated any number of times either in series or in parallel for any number of video frames, video sequences, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
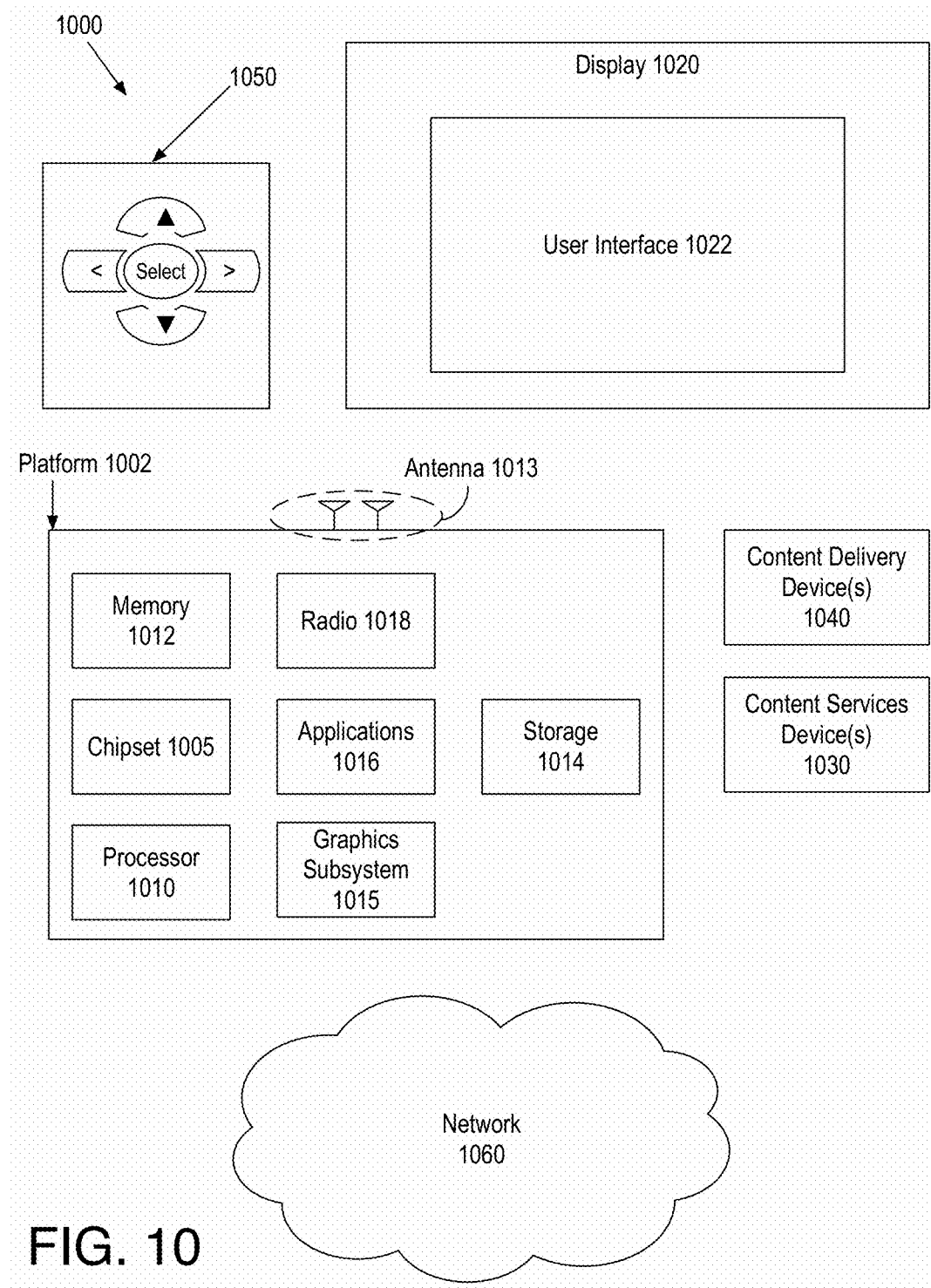
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1000 includes a platform 1002 coupled to a display 1020. Platform 1002 may receive content from a content device such as content services device(s) 1030 or content delivery device(s) 1040 or other similar content sources such as a camera or camera module or the like. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still images, graphics, or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 10.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
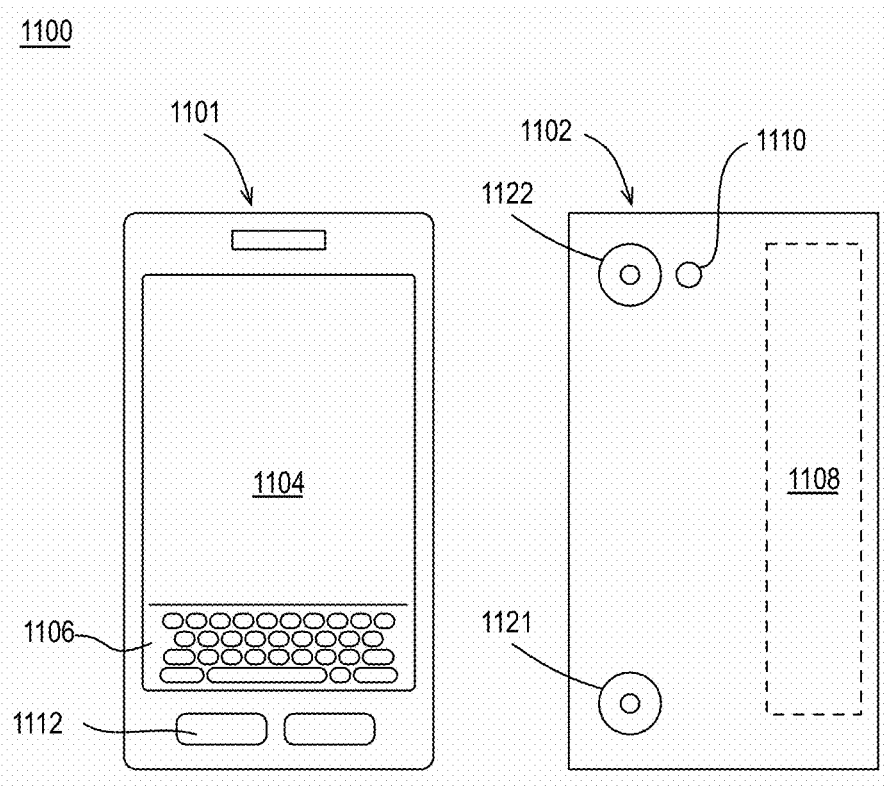
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems, components, or modules discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, a color camera 1121, a color camera 1122, and an integrated antenna 1108. For example, color camera 1121 and color camera 1122 and may input image data (e.g., left and right images) as discussed herein. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include color cameras 1121, 1122, and a flash 1110 integrated into back 1102 (or elsewhere) of device 1100. In other examples, color cameras 1121, 1122, and flash 1110 may be integrated into front 1101 of device 1100 or both front and back sets of cameras may be provided. Color cameras 1121, 1122 and a flash 1110 may be components of a camera module to originate color image data that may be processed into an image or streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

In one or more first embodiments, a method for providing segmentation in video comprises generating a convolutional neural network input comprising a current video frame, a temporally previous video frame, an object of interest indicator frame comprising one or more indicators of an object of interest in the current video frame, a motion frame comprising motion indicators indicative of motion from the previous video frame to the current video frame, and a plurality of feature frames each comprising features compressed from feature layers of an object classification convolutional neural network as applied to the current video frame, applying a segmentation convolutional neural network to the convolutional neural network input to generate a plurality of candidate segmentations of the current video frame, and selecting one of the candidate segmentations as a final segmentation corresponding to the current video frame.

In one or more second embodiments, further to the first embodiment, the method further comprises applying the classification convolutional neural network to the current video frame, retrieving, for each pixel of the current video frame, a plurality of feature values each from one of the layers of the classification convolutional neural network to generate a hypercolumn of feature values for each pixel, and compressing the hypercolumns to determine the plurality of feature frames.

In one or more third embodiments, further to the first or second embodiments, compressing the hypercolumns comprises applying Tucker decomposition to a feature volume comprising the hypercolumns to determine a core tensor comprising the plurality of compressed feature frames.

In one or more fourth embodiments, further to any of the first through third embodiments, a number of the compressed feature frames is not more than half of a number of feature values in each hypercolumn.

In one or more fifth embodiments, further to any of the first through fourth embodiments, the method further comprises receiving one or more user click indicators corresponding to one or more first locations in the temporally previous video frame and projecting each of the one or more first locations to one or more second locations in the current video frame using the motion frame to determine the one or more indicators of the object of interest in the current video frame.

In one or more sixth embodiments, further to any of the first through fifth embodiments, the one or more indicators of the object of interest indicator frame indicates locations of positive indicators indicative of the object of interest, the convolutional neural network input further comprising a background indicator frame comprising negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, value indicative of a minimum distance to any of the locations of the negative indicators.

In one or more seventh embodiments, further to any of the first through sixth embodiments, the convolutional neural network input further comprises a previous segmentation frame corresponding to the previous video frame.

In one or more eighth embodiments, further to any of the first through seventh embodiments, the segmentation convolutional neural network is pretrained using a loss function comprising a boundary loss term, the boundary loss term comprising differences between ground truth values for ground truth boundary points corresponding to a training object of interest and resultant values for the boundary points corresponding to application of the segmentation convolutional neural network during training.

In one or more ninth embodiments, further to any of the first through eighth embodiments, the boundary loss term comprises a pseudo Huber loss term comprising a square of a fraction of the difference over a steepness parameter, the steepness parameter to penalize boundary segmentation errors in the segmentation convolutional neural network.

In one or more tenth embodiments, further to any of the first through ninth embodiments, selecting the final segmentation from the candidate segmentations comprises applying a selection convolutional neural network to a second convolutional neural network input comprising the current video frame, the user input frame, and the plurality of candidate segmentations.

In one or more eleventh embodiments, further to any of the first through more embodiments, the current video frame comprises per pixel R, G, or B values, the previous video frame comprises per pixel R, G, or B values, the motion frame comprises per pixel velocity motion vectors, each of the feature frames comprises per pixel compressed feature values, and each of the candidate segmentations comprises per pixel probability values that each pixel is a member of the object of interest.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for providing segmentation in video comprising:
   a memory to store a current video frame; and
   one or more processors coupled to the memory, the one or more processors to:
      generate a convolutional neural network input comprising the current video frame, a temporally previous video frame, an object of interest indicator frame comprising one or more indicators of an object of interest in the current video frame, a motion frame comprising motion indicators indicative of motion from the previous video frame to the current video frame, and a plurality of feature frames each comprising features compressed from feature layers of an object classification convolutional neural network as applied to the current video frame;
      apply a segmentation convolutional neural network to the convolutional neural network input to generate a plurality of candidate segmentations of the current video frame; and
      select one of the candidate segmentations as a final segmentation corresponding to the current video frame.

2. The system of claim 1, the one or more processors to:
   apply the classification convolutional neural network to the current video frame;
   retrieve, for each pixel of the current video frame, a plurality of feature values each from one of the layers of the classification convolutional neural network to generate a hypercolumn of feature values for each pixel; and
   compress the hypercolumns to determine the plurality of feature frames.

3. The system of claim 2, wherein the one or more processors to compress the hypercolumns comprises the one or more processors to apply Tucker decomposition to a feature volume comprising the hypercolumns to determine a core tensor comprising the plurality of compressed feature frames.

4. The system of claim 3, wherein a number of the compressed feature frames is not more than half of a number of feature values in each hypercolumn.

5. The system of claim 1, the one or more processors to:
   receive one or more user click indicators corresponding to one or more first locations in the temporally previous video frame; and
   project each of the one or more first locations to one or more second locations in the current video frame using the motion frame to determine the one or more indicators of the object of interest in the current video frame.

6. The system of claim 5, wherein the one or more indicators of the object of interest indicator frame indicates locations of positive indicators indicative of the object of interest, the convolutional neural network input further comprising a background indicator frame comprising negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, value indicative of a minimum distance to any of the locations of the negative indicators.

7. The system of claim 1, wherein the convolutional neural network input further comprises a previous segmentation frame corresponding to the previous video frame.

8. The system of claim 1, wherein the segmentation convolutional neural network is pretrained using a loss function comprising a boundary loss term, the boundary loss term comprising differences between ground truth values for ground truth boundary points corresponding to a training object of interest and resultant values for the boundary points corresponding to application of the segmentation convolutional neural network during training.

9. The system of claim 8, wherein the boundary loss term comprises a pseudo Huber loss term comprising a square of a fraction of the difference over a steepness parameter, the steepness parameter to penalize boundary segmentation errors in the segmentation convolutional neural network.

10. The system of claim 1, wherein the one or more processors to select the final segmentation from the candidate segmentations comprises the one or more processors to apply a selection convolutional neural network to a second convolutional neural network input comprising the current video frame, the user input frame, and the plurality of candidate segmentations.

11. The system of claim 1, wherein the current video frame comprises per pixel R, G, or B values, the previous video frame comprises per pixel R, G, or B values, the motion frame comprises per pixel velocity motion vectors, each of the feature frames comprises per pixel compressed feature values, and each of the candidate segmentations comprises per pixel probability values that each pixel is a member of the object of interest.

12. A method for providing segmentation in video comprising:
   generating a convolutional neural network input comprising a current video frame, a temporally previous video frame, an object of interest indicator frame comprising one or more indicators of an object of interest in the current video frame, a motion frame comprising motion indicators indicative of motion from the previous video frame to the current video frame, and a plurality of feature frames each comprising features compressed from feature layers of an object classification convolutional neural network as applied to the current video frame;

applying a segmentation convolutional neural network to the convolutional neural network input to generate a plurality of candidate segmentations of the current video frame; and selecting one of the candidate segmentations as a final segmentation corresponding to the current video frame.

13. The method of claim 12, further comprising:

applying the classification convolutional neural network to the current video frame;

retrieving, for each pixel of the current video frame, a plurality of feature values each from one of the layers of the classification convolutional neural network to generate a hypercolumn of feature values for each pixel; and compressing the hypercolumns to determine the plurality of feature frames.

14. The method of claim 13, wherein compressing the hypercolumns comprises applying Tucker decomposition to a feature volume comprising the hypercolumns to determine a core tensor comprising the plurality of compressed feature frames.

15. The method of claim 12, further comprising:

receiving one or more user click indicators corresponding to one or more first locations in the temporally previous video frame; and projecting each of the one or more first locations to one or more second locations in the current video frame using the motion frame to determine the one or more indicators of the object of interest in the current video frame.

16. The method of claim 15, wherein the one or more indicators of the object of interest indicator frame indicates locations of positive indicators indicative of the object of interest, the convolutional neural network input further comprising a background indicator frame comprising negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, value indicative of a minimum distance to any of the locations of the negative indicators.

17. The method of claim 12, wherein the segmentation convolutional neural network is pretrained using a loss function comprising a boundary loss term, the boundary loss term comprising differences between ground truth values for ground truth boundary points corresponding to a training object of interest and resultant values for the boundary points corresponding to application of the segmentation convolutional neural network during training.

18. At least one non-transitory computer readable medium comprising a plurality of instructions that, in response to being executed on a computing device, cause the computing device to provide segmentation in video by:

generating a convolutional neural network input comprising a current video frame, a temporally previous video frame, an object of interest indicator frame comprising one or more indicators of an object of interest in the current video frame, a motion frame comprising motion indicators indicative of motion from the previous video frame to the current video frame, and a plurality of feature frames each comprising features compressed from feature layers of an object classification convolutional neural network as applied to the current video frame;

applying a segmentation convolutional neural network to the convolutional neural network input to generate a plurality of candidate segmentations of the current video frame; and selecting one of the candidate segmentations as a final segmentation corresponding to the current video frame.

19. The non-transitory computer machine readable medium of claim 18, further comprising instructions that, in response to being executed on a computing device, cause the computing device to provide segmentation in video by:

applying the classification convolutional neural network to the current video frame;

retrieving, for each pixel of the current video frame, a plurality of feature values each from one of the layers of the classification convolutional neural network to generate a hypercolumn of feature values for each pixel; and compressing the hypercolumns to determine the plurality of feature frames.

20. The non-transitory computer machine readable medium of claim 18, further comprising instructions that, in response to being executed on a computing device, cause the computing device to provide segmentation in video by:

receiving one or more user click indicators corresponding to one or more first locations in the temporally previous video frame; and projecting each of the one or more first locations to one or more second locations in the current video frame using the motion frame to determine the one or more indicators of the object of interest in the current video frame.

21. The non-transitory computer readable medium of claim 20, wherein the one or more indicators of the object of interest indicator frame indicates locations of positive indicators indicative of the object of interest, the convolutional neural network input further comprising a background indicator frame comprising negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, value indicative of a minimum distance to any of the locations of the negative indicators.

22. The non-transitory computer readable medium of claim 18, wherein the segmentation convolutional neural network is pretrained using a loss function comprising a boundary loss term, the boundary loss term comprising differences between ground truth values for ground truth boundary points corresponding to a training object of interest and resultant values for the boundary points corresponding to application of the segmentation convolutional neural network during training.

* * * * *